US011493799B2

(12) United States Patent
Lin et al.

(10) Patent No.: US 11,493,799 B2
(45) Date of Patent: *Nov. 8, 2022

(54) DISPLAY DEVICE

(71) Applicant: InnoLux Corporation, Miao-Li County (TW)

(72) Inventors: Chih-Yu Lin, Miao-Li County (TW); Kuan-Chou Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,228

(22) Filed: Jul. 28, 2021

(65) Prior Publication Data

US 2021/0356810 A1    Nov. 18, 2021

Related U.S. Application Data

(63) Continuation of application No. 16/580,406, filed on Sep. 24, 2019, now Pat. No. 11,106,079.

(30) Foreign Application Priority Data

Oct. 24, 2018   (CN) .......................... 201811246535.1

(51) Int. Cl.
*G02F 1/1335*  (2006.01)
*G02F 1/1347*  (2006.01)
*G06F 3/0362*  (2013.01)

(52) U.S. Cl.
CPC ...... *G02F 1/133528* (2013.01); *G02F 1/1347* (2013.01); *G06F 3/0362* (2013.01)

(58) Field of Classification Search
None
See application file for complete search history.

(56) References Cited

U.S. PATENT DOCUMENTS

| 5,777,603 | A | 7/1998 | Jaeger |
|---|---|---|---|
| 9,897,840 | B2 | 2/2018 | Fan |
| 2008/0129707 | A1 | 6/2008 | Pryor |
| 2009/0316082 | A1 | 12/2009 | Bae et al. |
| 2016/0103649 | A1 | 4/2016 | Yoshitani et al. |
| 2017/0052399 | A1 | 2/2017 | Guzman et al. |
| 2017/0102788 | A1 | 4/2017 | Arceo et al. |
| 2017/0228209 | A1 | 8/2017 | Watanabe |
| 2018/0151539 | A1 | 5/2018 | Nakamura et al. |
| 2018/0322848 | A1 | 11/2018 | Wu et al. |
| 2019/0384121 | A1 | 12/2019 | Nishiwaki et al. |
| 2020/0089337 | A1 | 3/2020 | Togashi |
| 2020/0137899 | A1 | 4/2020 | Lin et al. |

FOREIGN PATENT DOCUMENTS

CN    105044959 A    11/2015

*Primary Examiner* — Shan Liu
(74) *Attorney, Agent, or Firm* — Muncy, Geissler, Olds & Lowe, P.C.

(57) ABSTRACT

Provided is a display device including: a backlight module; a first display panel disposed on the backlight module and including a first polarizer; and a second display panel disposed on the backlight module and including a second polarizer, wherein the first polarizer has a first projection, the second polarizer has a second projection, and an area of an overlap between the first projection and the second projection accounts for 10% or less of an area of the second projection, wherein the first display panel comprises a non-display area, and the second display panel corresponds in position to the non-display area.

17 Claims, 5 Drawing Sheets

DISPLAY DEVICE

CROSS REFERENCE TO RELATED APPLICATION

This application also claims the benefits of the Chinese Patent Application Serial Number 201811246535.1 filed on Oct. 24, 2018, the subject matter of which is incorporated herein by reference.

This application is a continuation (CA) of U.S. Patent application for "Display device", U.S. application Ser. No. 16/580,406 filed Sep. 24, 2019, and the subject matter of which is incorporated herein by reference.

BACKGROUND

1. Field of the Disclosure

The present disclosure relates to display devices and, more particularly, to a display device comprising a first display panel and a second display panel which are capable of sharing backlight.

2. Description of Related Art

To get in line with technological advancements and meet consumer needs, a center informative display (CID) is mounted inside a vehicular display device to attain integration of control over a touch display panel, thereby allowing the functions and internal environment of the vehicle to be adjusted by the touch display panel.

However, the conventional vehicular CID is usually equipped with an out-cell touch panel and thus has a plethora of touch functions. Owing to the plethora of touch functions, drivers find the CID inconvenient to operate or distracting.

Therefore, it is imperative to provide a display device which overcomes the aforesaid drawbacks of the prior art.

SUMMARY

In view of the aforesaid drawbacks of the prior art, it is an objective of the present disclosure to provide a display device characterized in that a first display panel and a second display panel coupled to an operating structure are integrated such that the second display panel coupled to the operating structure feeds information back to a driver to reduce the distraction risk which the driver will be otherwise predisposed to.

In order to achieve the above and other objectives, the present disclosure provides a display device comprising: a backlight module; a first display panel disposed on the backlight module and comprising a first polarizer; and a second display panel disposed on the backlight module and comprising a second polarizer, wherein the first polarizer has a first projection, the second polarizer has a second projection, and an area of an overlap between the first projection and the second projection accounts for 10% or less of an area of the second projection, wherein the first display panel comprises a non-display area, and the second display panel corresponds in position to the non-display area.

DETAILED DESCRIPTION OF THE EMBODIMENTS

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

Ordinal numbers, such as "first," "second" and "third", used herein are intended to distinguish components rather than disclose explicitly or implicitly that names of the components bear the wording of the ordinal numbers. The ordinal numbers do not imply what order a component and another component are in terms of space, time or steps of a manufacturing method. The ordinal numbers are only intended to distinguish a component with a name from another component with the same name.

When used herein and descriptive of a given value or range, the term "almost" means that the value or range can vary by 20% or less, 10% or less, 5% or less, 3% or less, 2% or less, 1% or less, or 0.5% or less. Furthermore, even if a given value or range is not specifically described by the term "almost," the value or range may still be implicitly interpreted in a manner as if it were specifically described by the term "almost."

A directive term, such as "on," used herein may refer to two components in direct contact with each other or refer to two components not in direct contact with each other.

The present disclosure is hereunder illustrated by exemplary embodiments, but the present disclosure is not limited thereto. Instead, the present disclosure may combine with any other known structures to create any new embodiment.

Figure 1A:
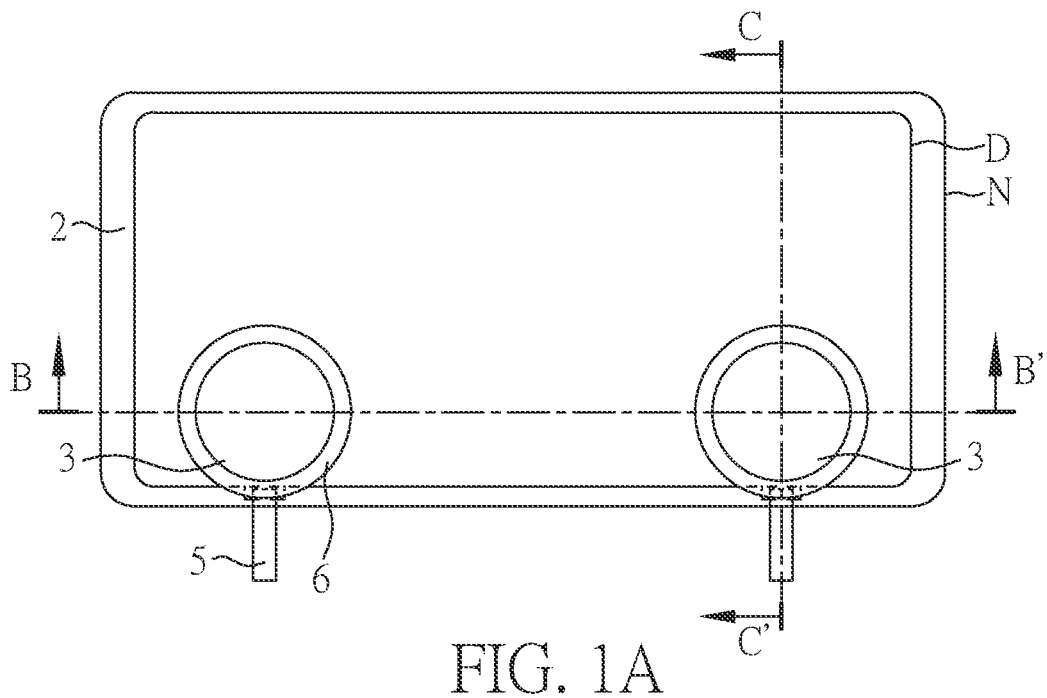
FIG. 1A is a schematic view of a display device according to an embodiment of the present disclosure.
Figure 1B:
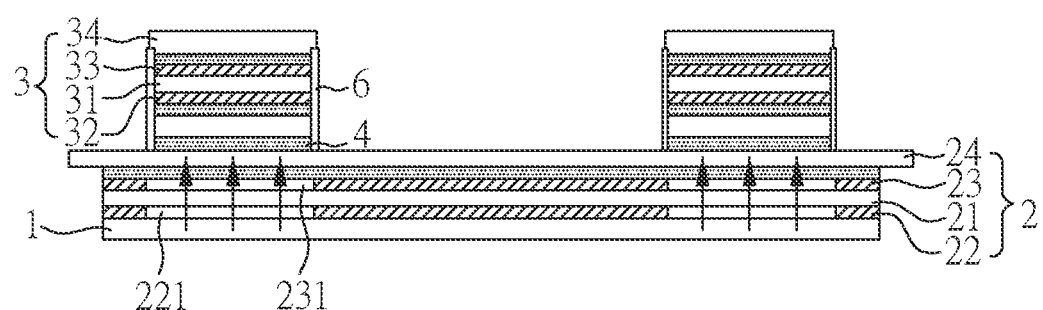
FIG. 1B is a cross-sectional view of the display device taken along line BB' of FIG. A.
Figure 1C:
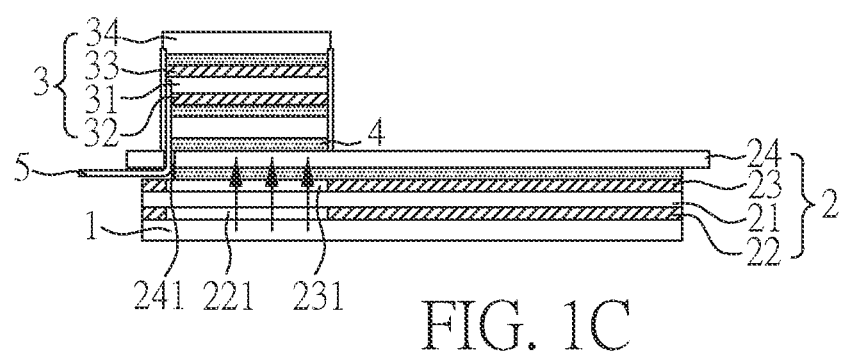
FIG. 1C is a cross-sectional view of the display device taken along line CC' of FIG. 1A.

FIG. 1A is a schematic view of a display device according to an embodiment of the present disclosure. FIG. 1B is a cross-sectional view of the display device taken along line BB' of FIG. 1A. FIG. 1C is a cross-sectional view of the display device taken along line CC' of FIG. 1A. First, a first display unit 21 is provided such that a first polarizer 22 and a third polarizer 23 are adhered to two opposing sides of the first display unit 21, respectively, to form a first display panel 2. Furthermore, a second display unit 31 is provided such that a second polarizer 32 and a fourth polarizer 33 are adhered to two opposing sides of the second display unit 31, respectively, to form a second display panel 3. In an embodiment of the present disclosure, the first display panel 2 may further comprise a first substrate 24 adhered to the third polarizer 23, and the first substrate 24 is disposed between the first polarizer 22 and the second polarizer 32. In another embodiment of the present disclosure, the first display panel 2 may not include the first substrate 24. In an embodiment of the present disclosure, the second display panel 3 may further comprise a second substrate 34 adhered to the fourth polarizer 33. In another embodiment of the present disclosure, the second display panel 3 may not include the second substrate 34. Furthermore, this embodiment of the present disclosure provides a backlight module 1 which the first display panel 2 and the second display panel 3 are disposed on, so as to implement the display device of the present disclosure.

Although the first display unit 21 and the second display unit 31 serve exemplary purposes, the present disclosure is not limited thereto; hence, the display device of the present disclosure will work, provided that the display panels require backlight. Likewise, a display medium contained in the display units of the present disclosure is not limited to liquid crystal materials, and thus any other appropriate display mediums are applicable to the display units of the present disclosure. In an aspect of the present disclosure, the second display panel 3 is a transflective display panel, but the present disclosure is not limited thereto; hence, the present disclosure is not restrictive of the materials which the first substrate 24 and the second substrate 34 are made of. For example, the first substrate 24 and the second substrate 34 are made of a quartz substrate, a glass substrate, a wafer substrate, a sapphire substrate, and an acrylic substrate, but the present disclosure is not limited thereto.

Referring to FIG. 1A, FIG. 1B and FIG. 1C, the display device of the present disclosure comprises: a backlight module 1; a first display panel 2 disposed on the backlight module 1 and comprising a first polarizer 22; and a second display panel 3 disposed on the backlight module 1 and comprising a second polarizer 32. The first display panel 2 further comprises the third polarizer 23 disposed opposite to the first polarizer 22. Referring to FIG. 1B and FIG. 1C, the first polarizer 22 and the third polarizer 23 overlap almost completely, but the first polarizer 22 and the second polarizer 32 do not overlap; hence, the third polarizer 23 and the second polarizer 32 do not overlap either. FIG. 1E is a cross-sectional view of the display device according to another embodiment of the present disclosure. FIG. 1E is similar to FIG. 1B except that the first polarizer 22 or the third polarizer 23 overlaps the second polarizer 32 partially.

Figure 1D:
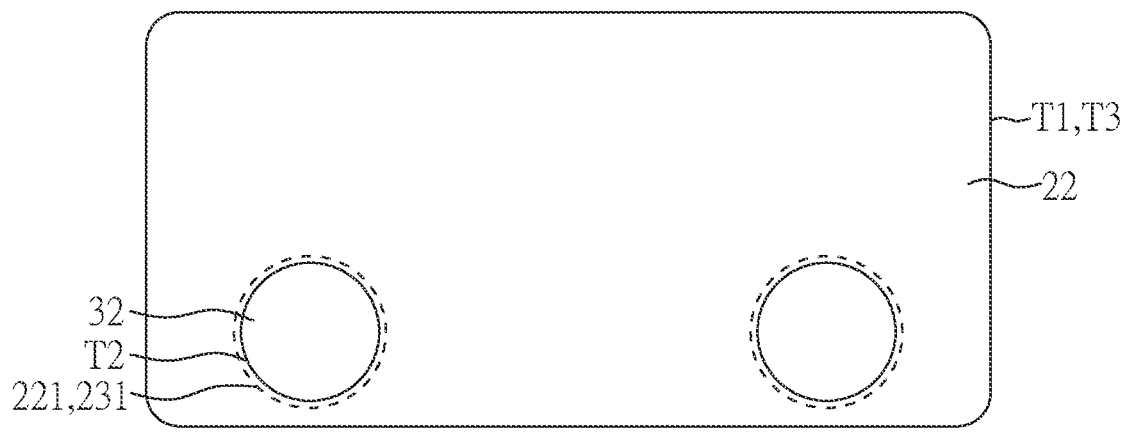
FIG. 1D is a top view of part of the display device shown in FIG. 1A.
Figure 1E:
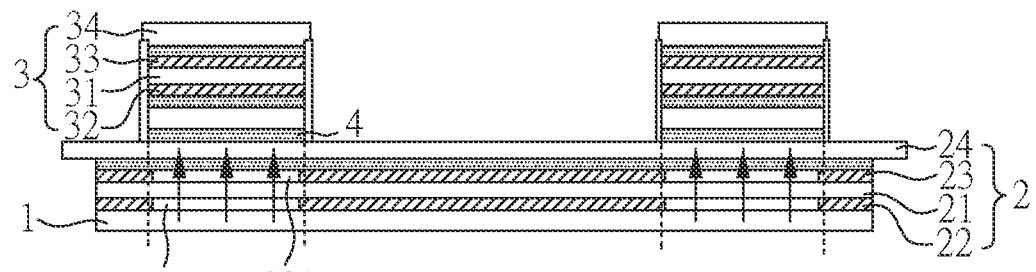
FIG. 1E is a cross-sectional view of the display device according to another embodiment of the present disclosure.
Figure 1F:
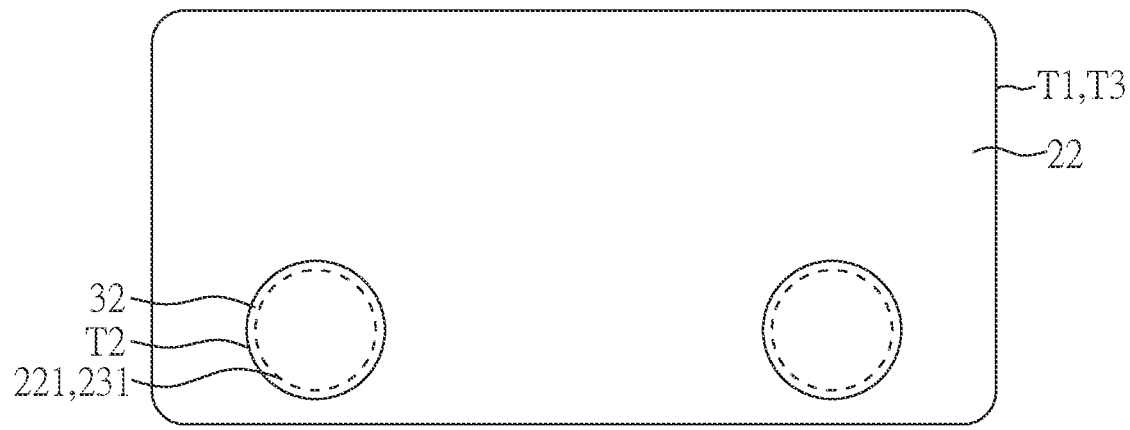
FIG. 1F is a top view of part of the display device shown in FIG. 1E.

FIG. 1D is a top view of part of the display device shown in FIG. 1A. As shown in FIG. 1D, the first polarizer 22 has a first projection T1, the second polarizer 32 has a second projection T2, and the third polarizer 23 has a third projection T3. Regarding the display device of the present disclosure, the area of the overlap between the first projection T1 and the second projection T2 accounts for 10% or less of the area of the second projection T2. Furthermore, as shown in FIG. 1B and FIG. 1D, the first polarizer 22 further comprises a first through hole 221 corresponding in position to the second display panel 3. The area of overlap between the first projection T1 and the second projection T2 does not account for any area of the second projection T2 upon satisfaction of two criteria as follows: the area of the first through hole 221 is greater than or equal to the area of the second projection T2, and the first through hole 221 overlaps the second projection T2 in a top-view direction. FIG. 1F is a top view of part of the display device shown in FIG. 1E. As shown in FIG. 1F, the first polarizer 22 and the third polarizer 23 have the first projection T1 and the third projection T3, respectively. The first projection T1 overlaps the third projection T3 almost completely. The first projection T1 and the third projection T3 each overlap the second projection T2 partially. Referring to FIG. 1E and FIG. 1F, the area of the overlap between the first projection T1 and the second projection T2 accounts for 10% or less of the area of the second projection T2 upon satisfaction of two criteria as follows: the area of the first through hole 221 is less than the area of the second projection T2, and the first through hole 221 overlaps the second projection T2 in a top-view direction. The present disclosure is not restrictive of the shape of the first through hole 221. In practice, the first through hole 221 is, for example, round, oval, rectangular, or of irregular shape, but the present disclosure is not limited thereto.

Referring to FIG. 1D and FIG. 1F, the third polarizer 23 of the first display panel 2 has a third projection T3. The area of the overlap between the third projection T3 and the second projection T2 accounts for 10% or less of the area of the second projection T2. Furthermore, the third polarizer 23 further comprises a third through hole 231 corresponding in position to the second display panel 3. Referring to FIGS. 1B and 1D, the area of the overlap between the third projection T3 and the second projection T2 does not account for any area of the second projection T2 upon satisfaction of two criteria as follows: the area of the third through hole 231 is greater than or equal to the area of the second projection T2, and the third through hole 231 overlaps the second projection T2 in a top-view direction. Referring to FIG. 1E and FIG. 1F, the area of the overlap between the third projection T3 and the second projection T2 accounts for a percentage, i.e., greater than 0% but less than or equal to 10%, of the area of the second projection T2 upon satisfaction of two criteria, as follows: the area of the third through hole 231 is less than the area of the second projection T2, and the third through hole 231 overlaps the second projection T2 in a top-view direction.

In the aforesaid embodiment, the first polarizer 22 overlaps the third polarizer 23 almost completely, but the present disclosure is not limited thereto. For example, in another embodiment of the present disclosure, the first polarizer 22 may not overlap the second polarizer 32, but the third polarizer 23 may overlap the second polarizer 32 partially. Therefore, the area of the overlap between the first projection T1 and the second projection T2 does not account for any area of the second projection T2, whereas the area of the overlap between the third projection T3 and the second projection T2 accounts for a percentage, i.e., greater than 0% but less than or equal to 10%, of the area of the second projection T2, but the present disclosure is not limited thereto.

Referring to FIG. 1A and FIG. 1B, the second display panel 3 is disposed on the first display panel 2. The first display panel 2 comprises a display area D and a non-display area N disposed beside the display area D. The second display panel 3 corresponds in position to the display area D, but the present disclosure is not limited thereto.

Referring to FIG. 1B and FIG. 1C, the display device of the present disclosure may further comprise an adhesive layer 4 disposed between the first display panel 2 and the second display panel 3. The present disclosure is not restrictive of the material which the adhesive layer 4 is made of. For example, the material which the adhesive layer 4 is made of includes optical clear adhesive (OCA), optical clear resin (OCR) or a combination thereof. The light transmittance of the adhesive layer 4 ranges from 60% to 99% such that the light of the backlight module 1 can penetrate the adhesive layer 4 to reach the second display panel 3. Therefore, the first display panel 2 and the second display panel 3 are capable of sharing backlight.

Referring to FIG. 1C, the display device of the present disclosure further comprises a circuit board 5 electrically connected to the second display panel 3. In an aspect of the present disclosure, the first substrate 24 further comprises a second through hole 241, and the circuit board 5 penetrates the second through hole 241 to electrically connect to the second display panel 3, but the present disclosure is not limited thereto.

Referring to FIG. 1A, in the display device of the present disclosure, the second display panel 3 may be coupled to an operating structure 6, and the operating structure 6 feeds information back to a user. In an aspect of the present disclosure, the operating structure 6 is a knob. In another aspect of the present disclosure, the operating structure 6 may be a key or any component conducive to operation by the user, but the present disclosure is not limited thereto.

Figure 2A:
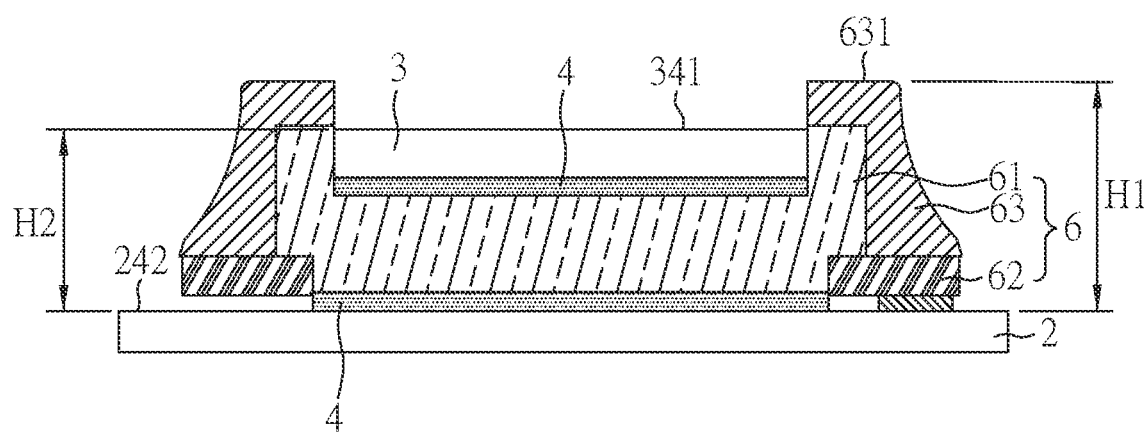
FIG. 2A is a cross-sectional view of a second display panel coupled to an operating structure according to an embodiment of the present disclosure.
Figure 2B:
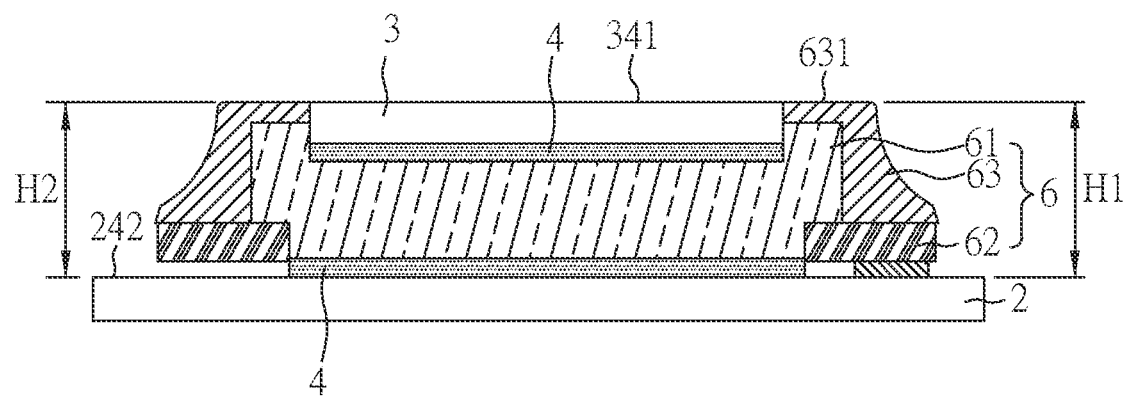
FIG. 2B is a cross-sectional view of the second display panel coupled to the operating structure according to another embodiment of the present disclosure.

FIG. 2A is a cross-sectional view of the second display panel 3 coupled to the operating structure 6 according to an embodiment of the present disclosure. FIG. 2B is a cross-sectional view of the second display panel 3 coupled to the operating structure 6 according to another embodiment of the present disclosure. Referring to FIG. 2A and FIG. 2B, the operating structure 6 comprises: a first sub-structure 61 which the second display panel 3 is disposed on and adhered to by the adhesive layer 4; a second sub-structure 62 which the first sub-structure 61 is disposed on; and a third sub-structure 63 disposed on the second sub-structure 62. Regarding the display device of the present disclosure, the first sub-structure 61 is adhered to the first display panel 2 by the adhesive layer 4. The first sub-structure 61, the second sub-structure 62 and the third sub-structure 63 together form the operating structure 6 and allow the second display panel 3 to be fixed to the first display panel 2. The user operates the operating structure 6 in order to operate the display device of the present disclosure and the other peripherals thereof, but the present disclosure is not limited thereto.

The first sub-structure 61 is made of a material with high light transmittance, for example, glass, acrylic, any other material with high light transmittance, or a combination thereof but the present disclosure is not limited thereto. The present disclosure is not restrictive of the materials which the second sub-structure 62 and the third sub-structure 63 are made of; hence, the materials which the second sub-structure 62 and the third sub-structure 63 are made of include, for example, metals (for example, aluminum and copper), an alloy thereof, polymeric resin (for example, poly(methyl methacrylate (PMMA), acrylonitrile butadiene styrene (ABS) or a combination thereof), but the present disclosure is not limited thereto. The second sub-structure 62 and the third substructure 63 may be made of identical or different materials.

In an aspect of the present disclosure, as shown in FIG. 2A, a first height H1 is defined by the distance between a top surface 631 of the operating structure 6 and a top surface 242 of the first display panel 2, whereas a second height H2 is defined by the distance between a top surface 341 of the second display panel 3 and the top surface 242 of the first display panel 2. The first height H1 is greater than the second height H2. In another aspect of the present disclosure, as shown in FIG. 2B, a first height H1 is defined by the distance between the top surface 631 of the operating structure 6 and the top surface 242 of the first display panel 2, whereas a second height H2 is defined by the distance between the top surface 341 of the second display panel 3 and the top surface 242 of the first display panel 2. The first height is substantially equal to the second height H2. According to the present disclosure, the first height H1 is the maximum height from the top surface 631 of the operating structure 6 to the top surface 242 of the first display panel 2, whereas the second height H2 is the maximum height from the top surface 341 of the second display panel 3 to the top surface 242 of the first display panel 2, but the present disclosure is not limited thereto.

Figure 3A:
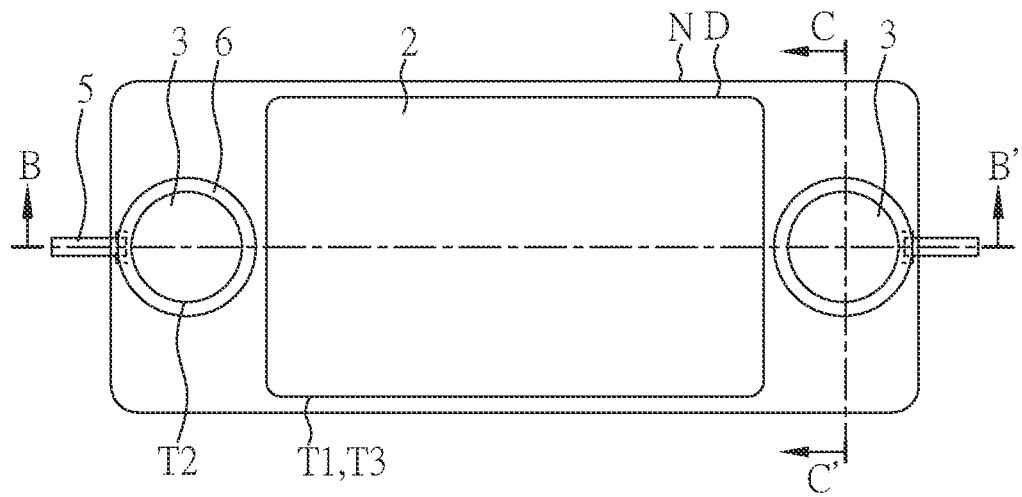
FIG. 3A is a schematic view of the display device according to an embodiment of the present disclosure.
Figure 3B:
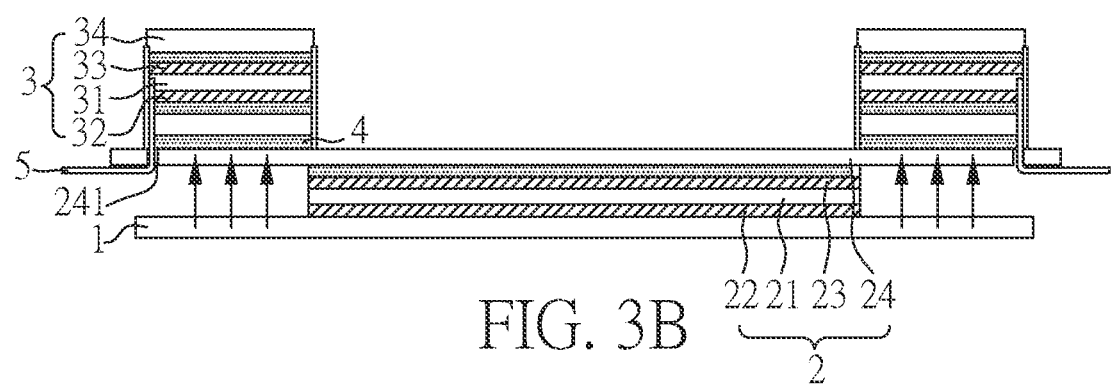
FIG. 3B is a cross-sectional view of the display device taken along line BB' of FIG. 3A.
Figure 3C:
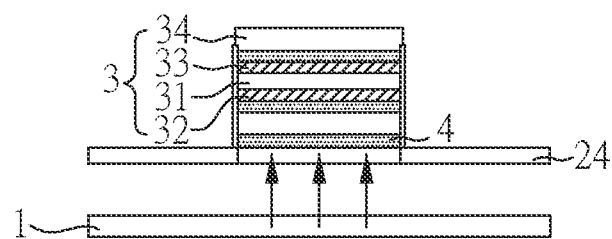
FIG. 3C is a cross-sectional view of the display device taken along line CC' of FIG. 3A.

FIG. 3A is a schematic view of the display device according to an embodiment of the present disclosure. FIG. 3B is a cross-sectional view of the display device taken along line BB' of FIG. 3A. FIG. 3C is a cross-sectional view of the display device taken along line CC' of FIG. 3A. The display device shown in FIG. 3A through FIG. 3C is similar to the display device shown in FIG. 1A through FIG. 1C, except for the technical features described below.

Referring to FIGS. 3A-3C, the second display panel 3 is disposed on two sides of the first display panel 2. Furthermore, the first display panel 2 and the second display panel 3 are each disposed on the backlight module 1, whereas the second display panel 3 corresponds in position to the non-display area N of the first display panel 2. Therefore, the second display panel 3 and the first display panel 2 are capable of sharing the backlight module 1, whereas the first display panel 2 does not affect the display quality of the second display panel 3. The second display panel 3 is disposed on the left and right sides of the first display panel 2, but the present disclosure is not limited thereto. For example, the second display panel 3 may be disposed on the upper and lower sides of the first display panel 2.

The second display panel 3 is disposed at the non-display area N of the first display panel 2. Therefore, the area of the overlap between the first projection T1 and the second projection T2 does not account for any area of the second projection T2 whenever the first polarizer 22 does not overlap the second polarizer 32 in a top-view direction, in another embodiment of the present disclosure, the area of the overlap between the first projection T1 and the second projection T2 accounts for a percentage, i.e., greater than 0% but less than or equal to 10%, of the area of the second projection T2 upon satisfaction of two criteria as follows: the second display panel 3 is disposed at the non-display area N of the first display panel 2, and the first polarizer 22 overlaps the second polarizer 32 partially in a top-view direction. Likewise, if the third polarizer 23 does not overlap the second polarizer 32 in a top-view direction, the area of the overlap between the third projection T3 and the second projection T2 will not account for any area of the second projection T2. If the third polarizer 23 overlaps the second polarizer 32 partially in a top-view direction, the area of the overlap between the third projection T3 and the second projection T2 will account for a percentage, i.e., greater than 0% but less than or equal to 10%, of the area of the second projection T2.

Figure 4A:
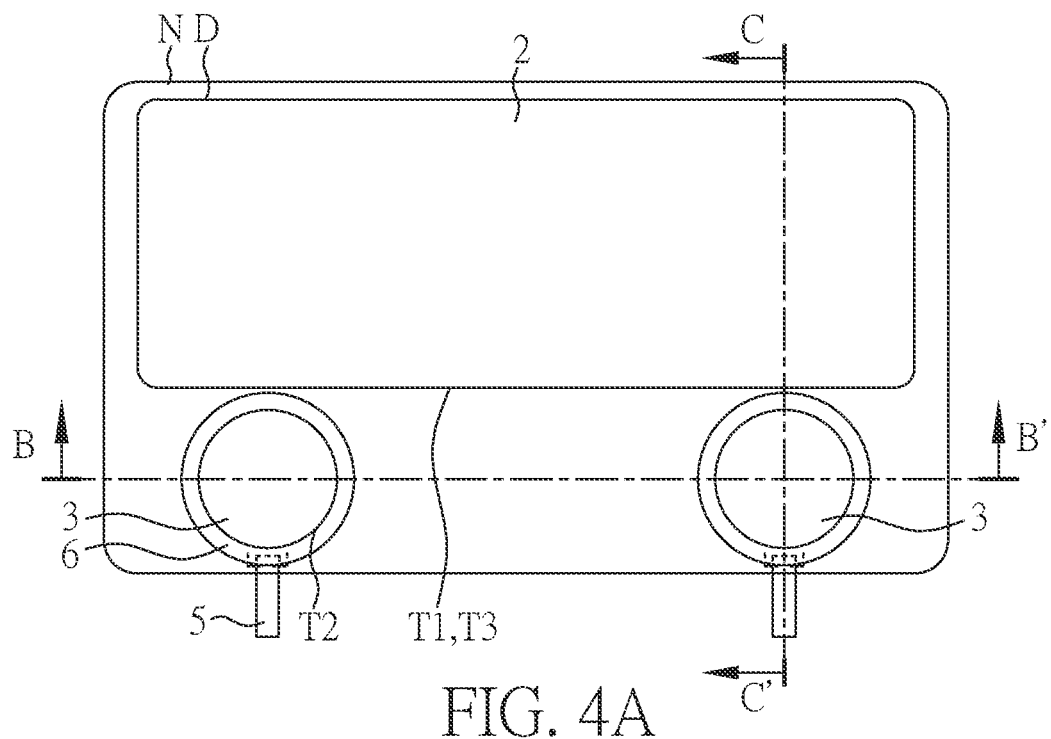
FIG. 4A is a schematic view of the display device according to an embodiment of the present disclosure.
Figure 4B:
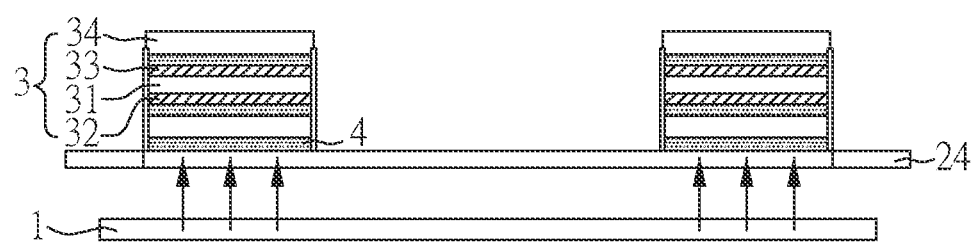
FIG. 4B is a cross-sectional view of the display device taken along line BB' of FIG. 4A.
Figure 4C:
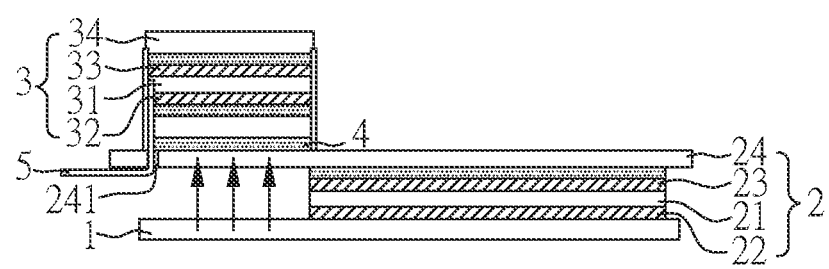
FIG. 4C is a cross-sectional view of the display device taken along line CC' of FIG. 4A.

FIG. 4A is a schematic view of the display device according to an embodiment of the present disclosure. FIG. 4B is a cross-sectional view of the display device taken along line BB' of FIG. 4A. FIG. 4C is a cross-sectional view of the display device taken along line CC' of FIG. 4A. The display device shown in FIG. 4A through FIG. 4C is similar to the display device shown in FIG. 3A through FIG. 3C except for the technical features described below.

Referring to FIGS. 4A-4C, the second display panel 3 is disposed on one side of the first display panel 2. Furthermore, the first display panel 2 and the second display panel 3 are each disposed on the backlight module 1, whereas the second display panel 3 corresponds in position to the non-display area N of the first display panel 2. Therefore, the second display panel 3 and the first display panel 2 are capable of sharing the backlight module 1, not to mention that the first display panel 2 does not affect the display quality of the second display panel 3. Referring to FIG. 4A, the second display panel 3 is disposed on the lower side of the first display panel 2, but the present disclosure is not limited thereto. For example, the second display panel 3 may also be disposed on the upper side, left side or right side of the first display panel 2.

The second display panel 3 is disposed at the non-display area N of the first display panel 2. Therefore, if the first polarizer 22 does not overlap the second polarizer 32 in a top-view direction, the area of the overlap between the first projection T1 and the second projection T2 will not account for any area of the second projection T2. In another embodiment of the present disclosure, the area of the overlap between the first projection T1 and the second projection T2 accounts for a percentage, greater than 0% but less than or equal to 10%, of the area of the second projection T2 upon satisfaction of two criteria as follows: the second display panel 3 is disposed at the non-display area N of the first display panel 2, and the first polarizer 22 overlaps the second polarizer 32 partially in a top-view direction. Likewise, if the third polarizer 23 does not overlap the second polarizer 32 in a top-view direction, the area of the overlap between the third projection T3 and the second projection T2 does not account for any area of the second projection T2. If the third polarizer 23 overlaps the second polarizer 32 partially in a top-view direction, the area of the overlap between the third projection T3 and the second projection T2 accounts for a percentage, i.e., greater than 0% but less than or equal to 10%, of the area of the second projection T2.

Although the present disclosure is exemplified by two second display panels 3, the present disclosure is not limited thereto. In this regard, the quantity, position and shape of the constituent elements of the display panel, as disclosed in the present disclosure, merely serve illustrative purposes; hence, details of the constituent elements of the display device of the present disclosure are subject to changes as needed, but the present disclosure is not limited thereto. For example, the present disclosure may provide only one second display panel 3 or at least two second display panels 3. According to the present disclosure, if the second display panels 3 are in the number of two or more, the area of the overlap between the second polarizer 32 of at least one of the second display panels 3 and at least one of the polarizers (the first polarizer 22 or the third polarizer 23) of the first display panel 2 in a top-view direction accounts for a percentage, ranging from greater than or equal to 0% to less than or equal to 10%, of the area of the second polarizer 32.

In conclusion, according to the present disclosure, a first display panel and a second display panel are capable of sharing backlight to thereby simplify a manufacturing process and reduce costs. Furthermore, given the integration of the first display panel and the second display panel coupled to the operating structure, the second display panel coupled to the operating structure feeds information back to a driver to reduce the distraction risk which the driver will be otherwise predisposed to.

The features in different embodiment can be mixed or combined to form another embodiment by persons skilled in the art without departing the spirit of the present disclosure.

The present disclosure is disclosed above by preferred embodiments. However, persons skilled in the art should understand that the preferred embodiments are illustrative of the present disclosure only, but shall not be interpreted as restrictive of the scope of the present disclosure.

What is claimed is:

1. A display device, comprising:
a backlight module emitting a light;
a first display panel disposed on the backlight module and comprising a first polarizer;
a second display panel disposed on the backlight module and comprising a second polarizer; and
a knob disposed on the first display panel and comprising a first sub-structure disposed between the second display panel and the first display panel,
wherein the first polarizer has a first projection, the second polarizer has a second projection, and an area of an overlap between the first projection and the second projection accounts for 10% or less of an area of the second projection,
wherein the first display panel comprises a non-display area, and the second display panel corresponds in position to the non-display area,
wherein the first display panel is adhered to the first sub-structure through a first adhesive layer, the second display panel is adhered to the first sub-structure through a second adhesive layer, and the light penetrates the first adhesive layer and the second adhesive layer.

2. The display device of claim 1, wherein the first display panel further comprises a third polarizer disposed opposite to the first polarizer, the third polarizer has a third projection, and an area of an overlap between the third projection and the second projection accounts for 10% or less of the area of the second projection.

3. The display device of claim 1, wherein the first display panel further comprises a first substrate disposed between the first polarizer and the second polarizer.

4. The display device of claim 1, further comprising a circuit board electrically connected to the second display panel.

5. The display device of claim 4, wherein the first display panel further comprises a first substrate disposed between the first polarizer and the second polarizer, the first substrate further comprises a through hole, and the circuit board penetrates the through hole to electrically connect to the second display panel.

6. The display device of claim 1, wherein the first adhesive layer is disposed between the first display panel and the second display panel.

7. The display device of claim 6, wherein light transmittance of the first adhesive layer is greater than or equal to 60% but less than or equal to 99%.

8. The display device of claim 1, wherein the second display panel is a transflective display panel.

9. The display device of claim 1, wherein the second display panel further comprises a fourth polarizer disposed opposite to the second polarizer and having a fourth projection, and an area of an overlap between the fourth projection and the first projection accounts for 10% or less of an area of the fourth projection.

10. The display device of claim 9, wherein the second display panel further comprises a second substrate disposed on the fourth polarizer.

11. The display device of claim 1, wherein the second display panel is disposed on the first display panel.

12. The display device of claim 1, wherein the second display panel is coupled to the knob, with a first height defined by a distance between a top surface of the knob and a top surface of the first display panel, and a second height defined by a distance between a top surface of the second display panel and the top surface of the first display panel, the first height being greater than the second height.

13. The display device of claim 1, wherein the second display panel is coupled to the knob, with a first height defined by a distance between a top surface of the knob and a top surface of the first display panel, and a second height defined by a distance between a top surface of the second display panel and the top surface of the first display panel, the first height being equal to the second height.

14. The display device of claim 1, wherein the second display panel is disposed on the first sub-structure.

15. The display device of claim 1, wherein light transmittance of the second adhesive layer is greater than or equal to 60% but less than or equal to 99%.

16. The display device of claim 1, further comprising a third display panel disposed on the backlight module, wherein the second display panel and the third panel are respectively disposed on two sides of the first display panel.

17. The display device of claim 1, further comprising a third display panel disposed on the backlight module, wherein the second display panel and the third panel are disposed on one side of the first display panel.

* * * * *